United States Patent [19]
Lamah et al.

[11] Patent Number: 5,999,680
[45] Date of Patent: Dec. 7, 1999

[54] TELECOMMUNICATIONS METHOD FOR USING INCOMPLETE CALL TIME

[76] Inventors: Ahmad Lamah, 387 Brookview Ct., Howell, N.J. 07731; Win Savery, 1 Madison La., Manalapan, N.J. 07726; Mohamad Ayoub, 72 Stonehurst Blvd., Freehold, N.J. 07728

[21] Appl. No.: 09/106,982

[22] Filed: Jun. 29, 1998

[51] Int. Cl.$^6$ .................................................. H04M 15/00
[52] U.S. Cl. ............... 385/127; 375/106.06; 340/870.02; 455/456
[58] Field of Search ...................... 379/112, 120, 379/127, 106.01, 106.03, 106.06, 106.08, 88.25, 88.21, 88.2, 88.19, 74, 75; 340/870.02; 455/456

[56] References Cited

U.S. PATENT DOCUMENTS

| | | |
|---|---|---|
| 4,551,581 | 11/1985 | Doughty . |
| 5,193,111 | 3/1993 | Matty et al. .................. 379/106.06 |
| 5,263,081 | 11/1993 | Nightingale et al. . |
| 5,351,296 | 9/1994 | Sullivan . |
| 5,365,576 | 11/1994 | Tsumura et al. . |
| 5,539,810 | 7/1996 | Kennedy, III et al. . |
| 5,544,225 | 8/1996 | Kennedy, III et al. . |
| 5,546,444 | 8/1996 | Roach, Jr. et al. . |
| 5,555,553 | 9/1996 | Jonsson . |
| 5,579,372 | 11/1996 | Astrom . |
| 5,598,458 | 1/1997 | Bales et al. . |
| 5,600,710 | 2/1997 | Weisser, Jr. et al. ................. 379/88.19 |
| 5,627,875 | 5/1997 | Kapsales . |
| 5,655,011 | 8/1997 | Brown ................................ 379/106.06 |
| 5,711,007 | 1/1998 | Lin et al. . |

*Primary Examiner*—Paul Loomis
*Attorney, Agent, or Firm*—Ira M. Adler, Esq.

[57] ABSTRACT

The present invention relates to a method for using the silent interval during which an incoming call is still on hook to send limited data to a switch for storage and eventual retrieval. The system may be used in connection with a global positioning application, such as truck monitoring, or remote water or electric meter reading system.

6 Claims, 4 Drawing Sheets

TELECOMMUNICATIONS METHOD FOR USING INCOMPLETE CALL TIME

FIELD OF THE INVENTION

The present invention relates to a method for using incomplete call time to send limited voice and data messages over telecommunications lines or trunks. Typically, when a call is made it originates at a calling station, passes through a central office, through a switch and terminates at a called station. The central office either sends a ring, a busy tone or a voice message to the calling station. The calling station is not charged during the time interval while the called station is on-hook. This is often referred to as silent, incomplete or soft time. The present invention makes use of what is an open, and uncharged for, full duplex channel between the calling station and the switch to send messages to the switch. These messages may be transmitted to the called station or stored for later transmission.

The invention may be used in connection with a global positioning system (GPS) to capture the location of a vehicle. The invention may also be used to transmit water or electric metering information to a central location.

BACKGROUND OF THE INVENTION

While numerous prior inventions have taught the utilization of silent time during telecommunication transmission, for example, U.S. Pat. No. 4,551,581, Doughty, these contain significant differences compared to the present invention. Doughty deals with the ring interval or the silent interval between the rings. In the present invention as soon as a call is received or detected by the switch, data is immediately requested from the calling party or sent to the calling party. The detection of the rings is not used in the present invention. This results in a much more flexible and universal system.

Roach, Jr. et al, U.S. Pat. No. 5,546,444, addresses the retrievaal of metering data, using a cellular system, but does not teach use of incomplete call time.

OBJECTS OF THE INVENTION

It is an object of the present invention, therefore, to is to provide a method for transferring message from a calling station to a central switch during the time interval that the called station is still on-hook. The called station could be switch itself.

SUMMARY OF THE INVENTION

As will become clear from the following description, the present invention provides a method for using the silent interval during which an incoming call is still on hook to send limited data to a switch for storage and eventual retrieval.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
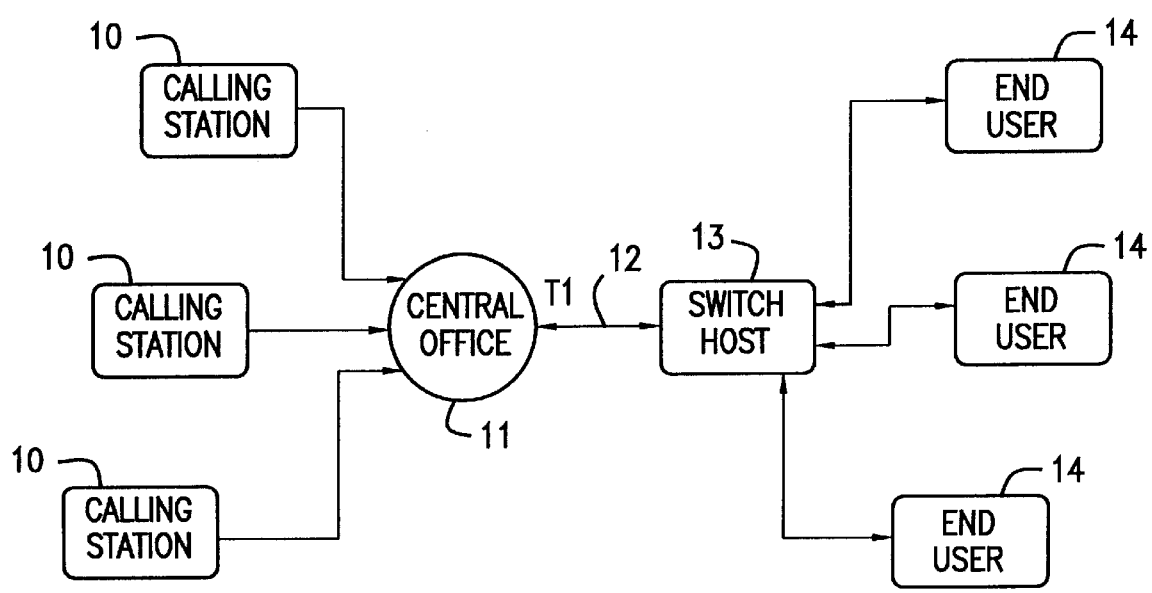
FIG. 1 is a block diagram of the overall system.

Referring to the drawings of the invention as in FIG. 1, which is an overview of the invention, it is seen that when a call is made from one of a multiplicity of calling stations, 10, it goes to a switch, 13, through a central office, 11. Here, the cental office sends the call through a dedicated line, 12, to the switch, 13. While the switch is still "on-hook" it will determine the source of the incoming call, then the switch will send a ring toneor a busy to the calling station. The called station could be the switch itself.

During the so-called "soft time", when the switch sends a ring tone or a busy signal to the calling station, the switch can also receive data from the calling station. This data can consist of a short voice message, metering data from a group of water or electric meters, or position information from a global positioning system (GPS). As can be seen, the switch receives data while it is sending a ring or a busy tone. This time interval is somewhat less than a minute.

After the switch, 13, receives that data from the calling station, it is stored in the switch for eventual retransmission to end users at one or multiple calling stations. The end users, 14, may access the data via a dialup modem, dedicated lines or the Internet.

Figure 2:
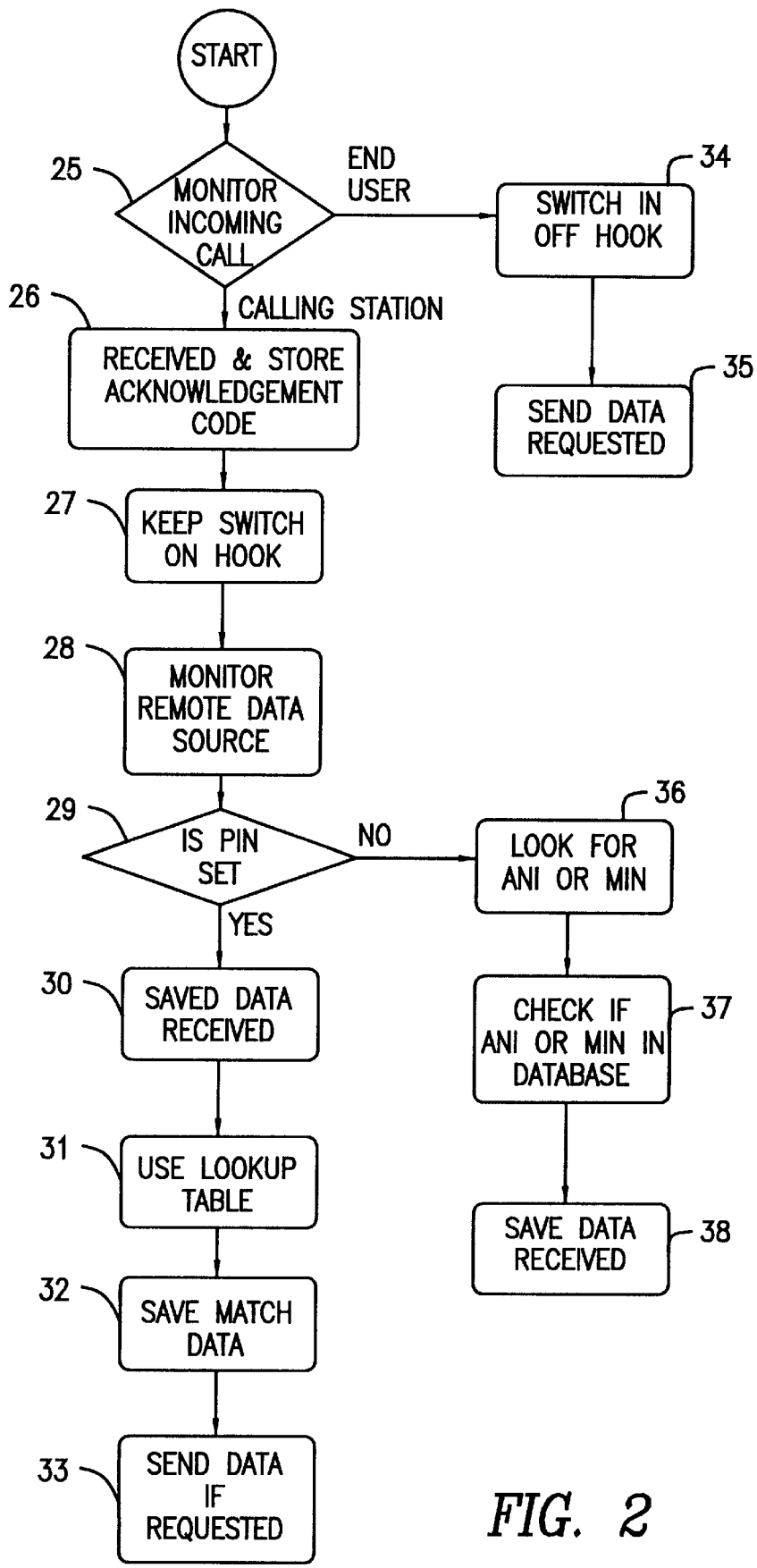
FIG. 2 is a block diagram of the switch program.

FIG. 2, is a flowchart of the switch program, which allows the receipt of data from remote calling stations while the call at the switch is sill "on-hook". Significantly, charges to the calling station are not incurred when call is 'off-hook". Therefore the data is transmitted to the switch before charges are incurred. The switch is constantly monitoring for incoming calls, 25. If a call is received the switch will determine if the call is coming from a calling station, sending data to the switch, or from an end user, requesting stored data from the switch. When a call comes in from a calling station, the receiver acknowledge function, 26, is activated. The switch stays on hook, 27, and sends either a ring or a busy signal to the calling station. At the same time, the switch receives data from the calling station.

Included in with the data is a personal identification number (PIN) or a mobile identification number (MIN). The PIN, the called number and the sent data are stored for later retrieval by endusers. In the event a telephone company doesn't pass the MIN or an Automatic Number Identification (ANI), these numbers can be stored at the host for every calling station, and they will have a PIN assigned to each number, to identify the calling station when it comes to the switch.

As is seen, the switch, 28, is continuously monitoring the source of information whether it is from an end user or from a calling station. If a call is coming from a calling station, the switch will check whether a PIN is received or not. If not, the the ANI or MIN is received, as in 36. Then the software will check if the MIN in the database, 37, and store the information received, 38, along with it. If the PIN is received, then the switch will immediately receive and save the data along with the pre-stored ANI or MIN, 30.

A table lookup, 31, using a computer program, is used to cross match, 32, the PIN with its corresponding telephone number. When an end user requests stored data, 33, the PIN, ANI, or MIN is entered to retrieve the appropriate data. During data retrieval the switch will be off-hook, 34, and the requested data will be transmitted, 35.

Figure 3:
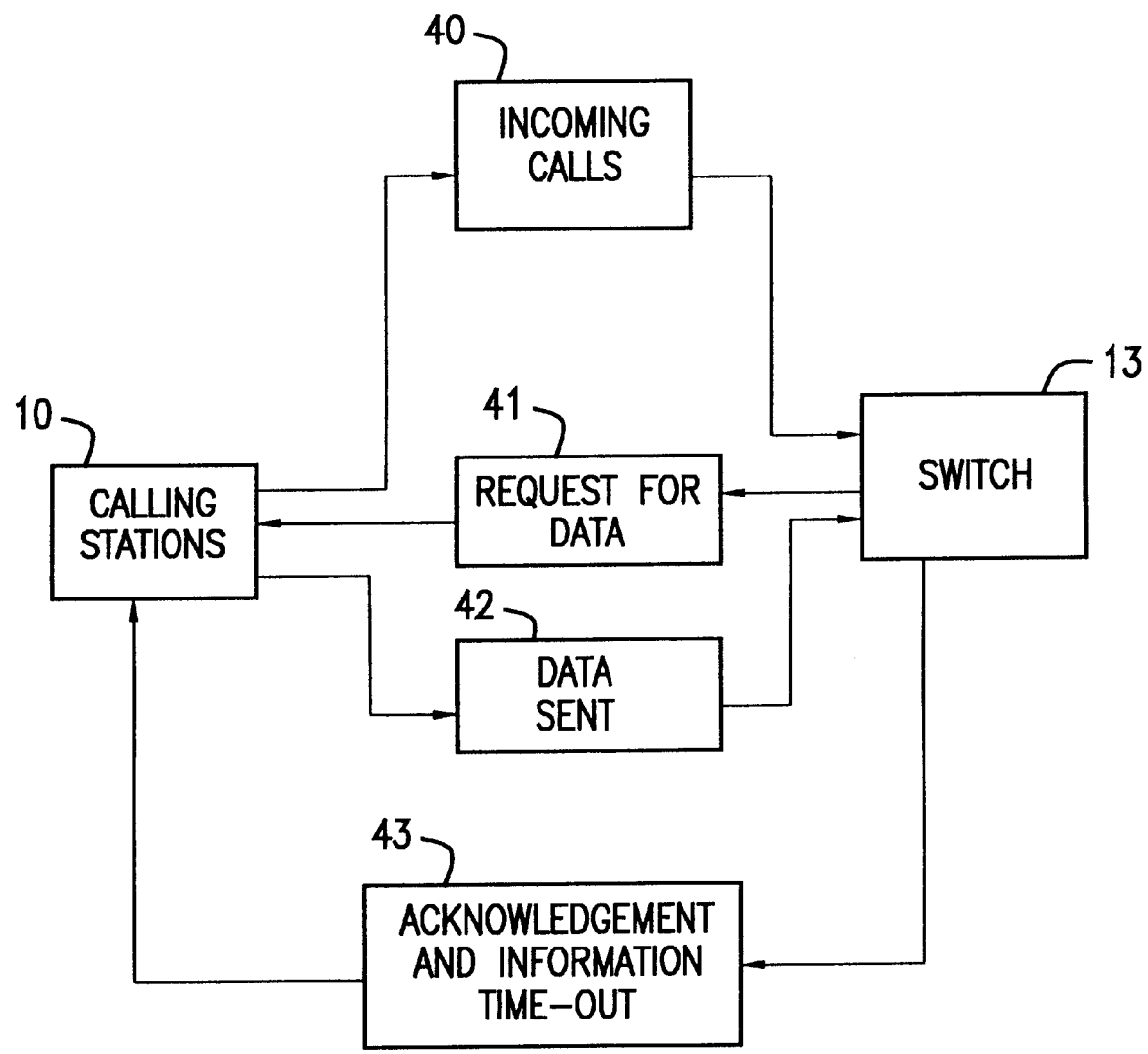
FIG. 3 is a diagram showing the time intervals of a message sent from a calling station to a switch.

FIG. 3, is a time diagram of the system. As can be seen, an incoming call, 40, is sent from the calling station, 10, to the switch, 13. The switch sends a request for data, 41, to the calling station. The calling station sends data or a message, 42, together with an identifier for the calling station. When the switch receives the data or message it sends an acknowledgment to the calling station to hang up and terminate the call, 43.

It should be noted that the calling stations are programmed to call the switch at different time intervals. When an incoming call is received by the switch, the switch upon recognizing the calling station's telephone number and PIN, sends a request for data. The calling station sends the data to the switch until the calling station hangs-up prior to the switch going off hook. The switch finally sends signal to the calling station to terminate the call.

Figure 4:
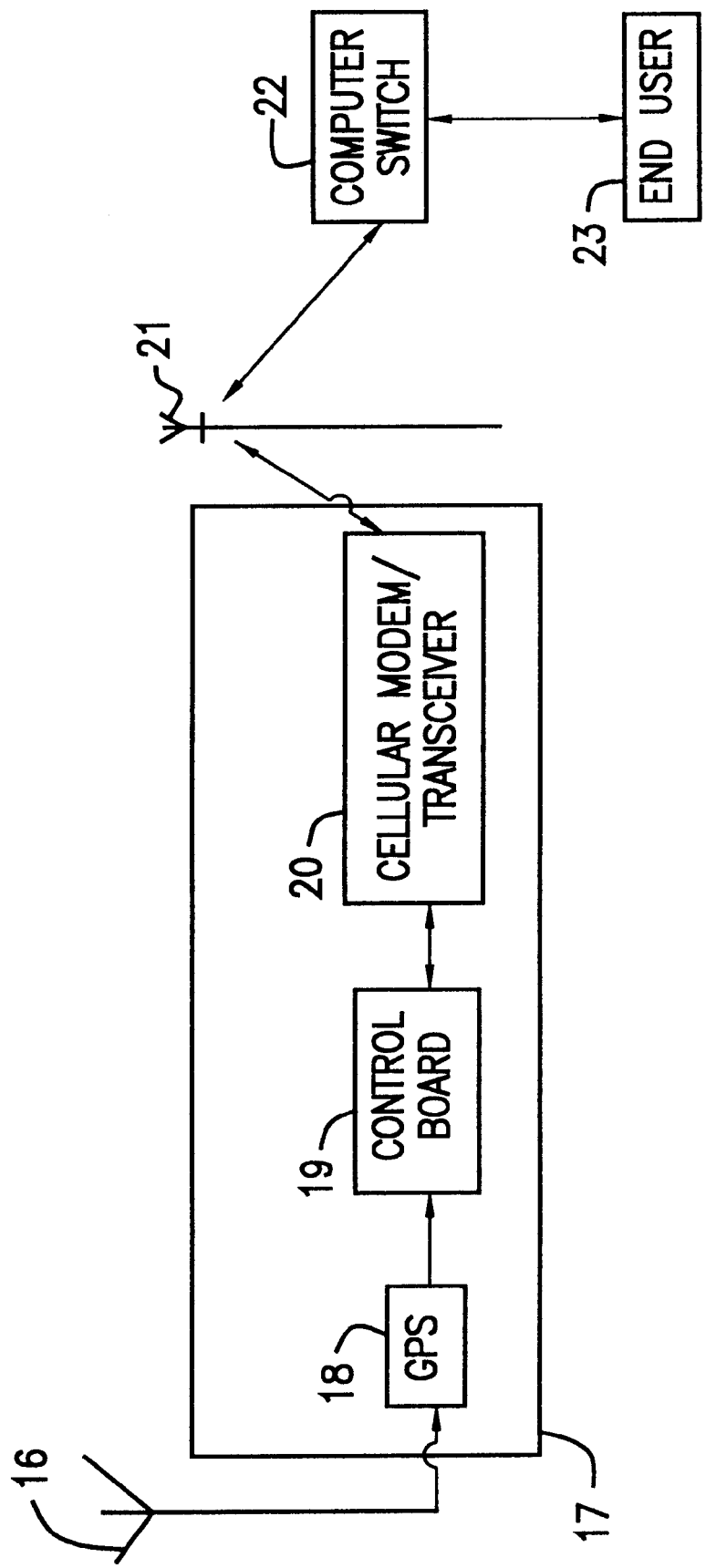
FIG. 4 is a diagram of an application of the invention used in connection with a global positioning system.

FIG. 4, illustrates an application of the invention with a global positioning system (GPS) used to trace vehicles anywhere on the globe. Typically, mapping data is stored in a computer to display the location of a vehicle. The GPS, 18, of a vehicle, 17, captures longitude and latitude coordinates from a satellite using an antenna, 16, and sends it to a control board, 19, to process the GPS data and arrange it in an appropriate format, while attaching the calling telephone number and the PIN.

When the data is requested by the switch, 22, a cellular transceiver captures the data from the control board, 19, and sends them over a cellular tower, 21, to host, 22, for future retrieval by end users, 23.

It is clear from the above that the calling station can just as easily be sending metering data from water or other type of meters, or could also be sending data for credit verification.

What I claim is:

1. A method for utilizing incomplete call time to send telecommunication messages from a calling station to a called station consisting of the following steps:

Initiating an incoming call signal from the calling station through a central office;

Passing the incoming call signal from the central office to a switch;

Sensing by the switch the source of the incoming call signal;

Sensing by the switch whether the called station is free;

Sending a ring, if the called station is not in-use, or a busy tone, if the called station is in-use, to the calling station, said ring or busy tone initiating an incomplete call interval;

Sending a message, from the calling station, at the initiation of the incomplete call interval, to the switch;

Sending a signal to the calling station, terminating the incomplete call interval by the calling station;

Storing the message in the switch; and

Assessing by the called station of the stored message in the switch.

2. The method in claim 1, wherein the switch performs the following steps:

Monitoring and capturing incoming calls;

Identifying the source of the incoming call;

Storing data received form different sources; and

Sending data as it is being requested by end users.

3. The method in claim 1, whereby the message from the calling station consists of data from a global positioning system.

4. The method in claim 1, whereby the message from the calling station consists of data from a metering system.

5. The method in claim 1, whereby the message from the calling station contains an identifier.

6. The method in claim 1, whereby the message from the calling station consists of data from a credit card verification system.

* * * * *